(12) United States Patent
Chang et al.

(10) Patent No.: US 6,542,331 B1
(45) Date of Patent: Apr. 1, 2003

(54) MAGNETIC HEAD HAVING WRITE HEAD WITH DOUBLE SPLIT YOKE

(75) Inventors: Thomas Young Chang, Menlo Park, CA (US); Terence Tin-Lok Lam, San Jose, CA (US); Edward HinPong Lee, San Jose, CA (US); Samuel Wonder Yuan, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,576

(22) Filed: Apr. 10, 2000

(51) Int. Cl.[7] .............................. G11B 5/31; G11B 5/17
(52) U.S. Cl. ..................................... 360/126; 360/123
(58) Field of Search ......................... 360/125, 123, 360/126, 124

(56) References Cited

U.S. PATENT DOCUMENTS

| | | | |
|---|---|---|---|
| 4,404,609 A | 9/1983 | Jones, Jr. ................. | 360/126 |
| 4,644,432 A | 2/1987 | Heim ........................ | 360/123 |
| 4,803,580 A | 2/1989 | Mowry ...................... | 360/121 |
| 4,825,318 A | 4/1989 | Hoo et al. ................. | 360/121 |
| 5,198,949 A | 3/1993 | Narisawa et al. ........... | 360/126 |
| 5,373,408 A | 12/1994 | Bischoff et al. ............ | 360/126 |
| 5,473,491 A * | 12/1995 | Fujisawa et al. ............ | 360/126 |
| 5,546,256 A * | 8/1996 | Tolman ...................... | 360/126 |
| 5,606,478 A * | 2/1997 | Chen et al. ................. | 360/126 |
| 5,644,457 A | 7/1997 | Llewellyn et al. .......... | 360/121 |
| 6,301,076 B1 * | 10/2001 | Stageberg et al. .......... | 360/126 |

* cited by examiner

Primary Examiner—Craig A. Renner
(74) Attorney, Agent, or Firm—Robert O. Guillot; Intellectual Property Law Offices

(57) ABSTRACT

The magnetic head of the present invention includes a P1 pole having an opening formed therethrough, and a P2 pole that is formed over the opening. A second magnetic pole tip is positioned relative to the first magnetic pole such that the first magnetic pole is symmetrically disposed relative to the second magnetic pole tip. Induction coils may be helically wound around portions of the first and/or second magnetic poles, or, alternatively, a planar, spiral induction coil may be fabricated for use with the first and second magnetic poles. An enhanced embodiment includes a first magnetic pole tip piece having a length that defines the throat length of the magnetic head and a thickness that increases the gap at rearward portions of the second magnetic pole tip of the magnetic head.

28 Claims, 6 Drawing Sheets

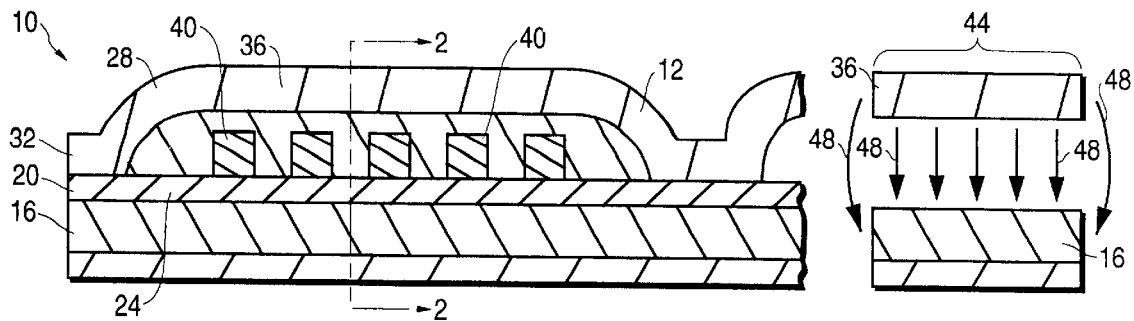
FIG. 1 (PRIOR ART)  FIG. 2 (PRIOR ART)
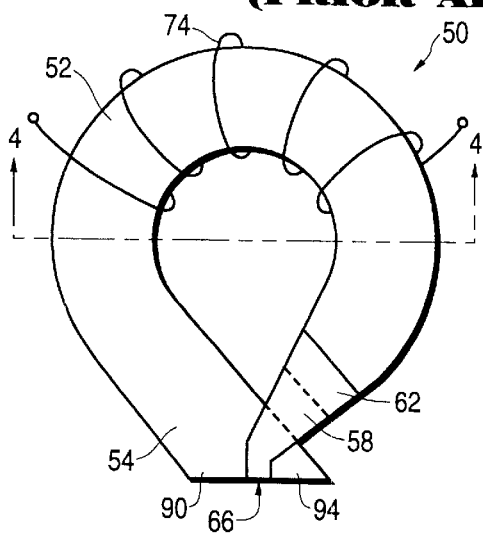
FIG. 3 (PRIOR ART)
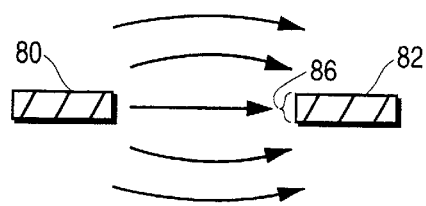
FIG. 4 (PRIOR ART)
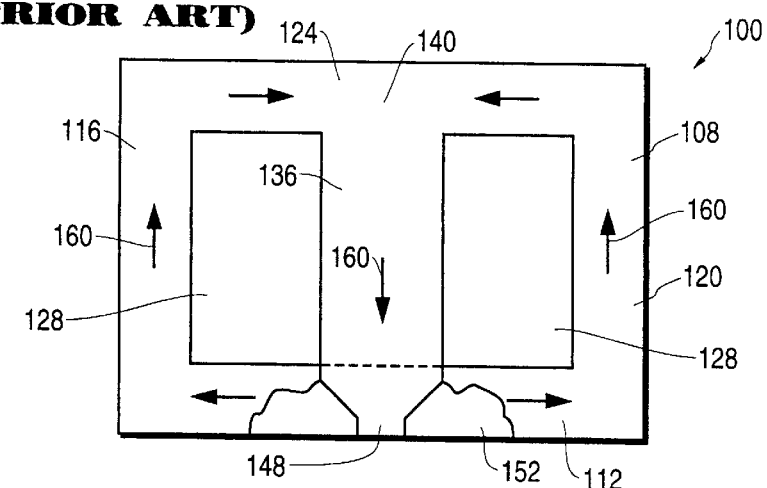
FIG. 5
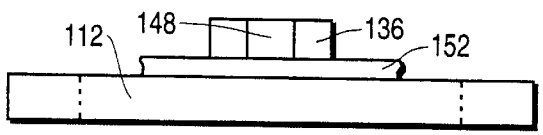
FIG. 6

US 6,542,331 B1

MAGNETIC HEAD HAVING WRITE HEAD WITH DOUBLE SPLIT YOKE

BACKGROUND OF THE INVENTION

1. Field of the Invention

The present invention relates generally to magnetic heads that are utilized with thin film hard disk data storage devices, and more particularly to the design and fabrication of the magnetic poles of the write head components of such magnetic heads.

2. Description of the Prior Art

The ongoing efforts to increase the data writing rates of magnetic heads is directly reflected in efforts to increase the rate, or frequency, of magnetic pulse changes through the magnetic poles of the write head element within the magnetic head. One of the problems encountered in increasing the magnetic flux frequency is that the permeability of the pole piece material tends to decrease as the frequency increases. This creates greater resistance to magnetic flux flow through the pole pieces, and leads to an increase in magnetic flux leakage between the two pole pieces in areas away from the write head gap.

The magnetic flux leakage problem is exacerbated by prior art pole tip designs in which two generally flat magnetic poles are disposed in a parallel relationship, because a major factor influencing magnetic flux leakage is the opposed area between the poles. That is, where there is a larger opposed area between the poles, magnetic flux leakage will tend to be larger.

The present invention seeks to significantly lower magnetic flux leakage between the poles, such that higher magnetic flux frequencies and therefore higher data writing rates are achieved.

SUMMARY OF THE INVENTION

The magnetic head of the present invention includes a P1 pole having an opening formed therethrough, and a P2 pole that is formed over said opening. A second magnetic pole tip is positioned relative to said first magnetic pole such that said first magnetic pole is symmetrically disposed relative to said second magnetic pole tip. Induction coils may be helically wound around portions of said first and/or second magnetic poles, or, alternatively, a planar, spiral induction coil may be fabricated for use with the first and second magnetic poles. An enhanced embodiment includes a first magnetic pole tip piece having a length that defines the throat length of the magnetic head and a thickness that increases the gap at rearward portions of the second magnetic pole tip of the magnetic head.

It is an advantage of the magnetic head of the present invention that magnetic flux leakage between the magnetic poles is reduced.

It is another advantage of the present invention that the magnetic flux frequency of the magnetic head is increased.

It is a further advantage of the magnetic head of the present invention that the data writing rate of the magnetic head is increased.

It is yet another advantage of the magnetic head of the present invention that the first magnetic pole is formed symmetrically relative to the second magnetic pole tip, such that equivalent side writing is obtained on both sides of a data track written by said magnetic head.

It is an advantage of the hard disk drive of the present invention that it includes a magnetic head wherein the magnetic flux leakage between the magnetic poles is reduced.

It is an advantage of the hard disk drive of the present invention that it includes a magnetic head wherein the magnetic flux frequency of the magnetic head is increased.

It is an advantage of the hard disk drive of the present invention that it includes a magnetic head wherein the data writing rate of the magnetic head is increased.

It is an advantage of the hard disk drive of the present invention that it includes a magnetic head wherein the first magnetic pole is formed symmetrically relative to the second magnetic pole tip, such that equivalent side writing is obtained on both sides of a data track written by said magnetic head.

These and other features and advantages of the present invention will no doubt become apparent to those skilled in the art upon reading the following detailed description which makes reference to the several figures of the drawing.

IN THE DRAWINGS

FIG. 1 is a side cross-sectional-view of a prior art magnetic head;

FIG. 2 is a cross-sectional view taken along lines 2—2 of FIG. 1;

FIG. 3 is a top plan view of a prior art magnetic head;

FIG. 4 is a cross-sectional view taken along lines 4—4 of FIG. 3;

FIG. 5 is a top plan view generally depicting the magnetic pole configuration of the magnetic head of the present invention;

FIG. 6 is an end elevational view of the magnetic head depicted in FIG. 5;

DETAILED DESCRIPTION OF THE PREFERRED EMBODIMENTS

Figure 7:
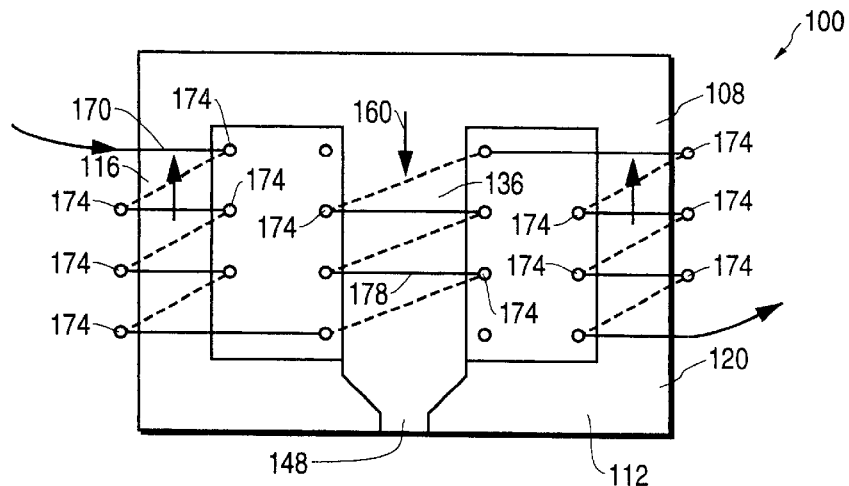
FIG. 7 is a top plan view depicting a first helical coil winding embodiment of the present invention.

Ongoing efforts to improve the operational characteristics of hard disk drive devices include efforts to increase the data writing speed of magnetic heads, such that data can be written faster on the hard disks of such hard disk drive devices. However, the efficiency of prior art magnetic heads generally decreases as the data writing rate of the magnetic heads is increased due to a decrease in the permeability of the magnetic poles of the magnetic heads when the magnetic flux rate is increased. Additionally, an increase in magnetic flux leakage between the magnetic poles occurs at high data writing rates, which also contributes to the inefficiency of prior art magnetic heads. The present invention provides improved magnetic pole configurations that reduce the magnetic flux leakage and therefore improve the efficiency of the magnetic heads. An understanding of the features and advantages of the present invention will be gained from a fuller understanding of the problems existing in the prior art, as is next provided with the aid of FIGS. 1 and 2.

FIGS. 1 and 2 are schematic depictions of a well known type of prior art write head element 12 of a magnetic head 10, wherein FIG. 1 is a side cross-sectional view and FIG. 2 is a cross-sectional view taken along lines 2—2 of FIG. 1. As will be well understood by those skilled in the art, FIGS. 1 & 2 depict basic structures of the prior art write head element only, including a P1 pole 16, a write gap 20 formed by a write gap layer 24, a P2 pole 28 which includes a tip portion 32 and a yoke portion 36, and a flat spiral induction coil 40 that is formed between the P1 pole and the P2 pole. Electrical current that flows through the induction coil 40 creates a magnetic flux within the P1 and P2 poles which is caused to pass across the write gap 20 between the P1 pole and the P2 pole tip.

A problem with such write head elements 12 is leakage of magnetic flux across the space between the P1 pole 16 and the yoke portion 36 of the P2 pole, and the greater the flux leakage the lower the efficiency of the write head element. That is, the write head element is most efficient where all of the magnetic flux flows across the write gap 20, such that magnetic media disposed proximate the write gap will be most strongly influenced by the flux passage across the gap. The ongoing effort to increase the data writing rate of write head elements has led to the use of higher frequencies of magnetic pulses to write data, and the use of higher frequencies has resulted in increased magnetic flux leakage, because the permeability of the pole tip materials decreases as the magnetic pulse frequency increases. As the permeability decreases it becomes more difficult to drive the magnetic flux through the pole tip material, and this results in a increase of flux leakage between the P1 pole and P2 pole at locations away from the write gap 20.

A second significant factor in inducing magnetic flux leakage in the write head element 12 is the overlapping nature of the P1 and P2 poles. Specifically, magnetic flux leakage is proportional to the overlapping areas of the P1 and P2 poles, and as can be seen in FIG. 2, the prior art write head element design includes a significant overlapping area 44 of the two poles for leakage 48 of magnetic flux between the poles.

FIGS. 3 and 4 depict a prior art write head element design 50 that has significantly reduced magnetic flux leakage, wherein FIG. 3 is a top plan view and FIG. 4 is a cross-sectional view taken along lines 4—4 of FIG. 3. As depicted in FIGS. 3 and 4, the write head element 50 is basically a loop-shaped pole piece 52, wherein a first end 54 of the loop serves as the P1 pole, and a second end 58 of the loop serves as the P2 pole. At some location along the loop, such as location 62, the P2 pole portion is raised relative to the P1 pole portion, such that a write gap 66 is formed between the P1 pole and the P2 pole tip 70. Also, to improve the efficiency in the creation of magnetic flux within the looped pole piece 52, the electrical coil 74 is formed in a helical shape around the pole pieces 52. Methods for fabricating such helical shaped coils are known in the art, and a detailed description is not necessary to the understanding of the present invention.

The write head element 50 produces decreased magnetic flux leakage because, as is best seen in FIG. 4, there is very little overlapping area between the opposing pole element sides 80 and 82. As seen in FIG. 4, basically only the edge portions 86 of the opposed pole pieces comprise an overlapping area, with, of course the inclusion of the overlap proximate the write gap 66. Although generally more difficult to fabricate than the flat spiral induction coils described herein above, the helical coils are more efficient in producing magnetic flux within the pole pieces, and because the helical coils are shorter in length than the spiral coils they generally have less resistance and inductance. Therefore the helical coils are typically easier to drive at high frequencies than the spiral coils.

A problem with the coil element design depicted in FIG. 3 is that the magnetic fields produced proximate the write gap 66 are not symmetrical. That is, as is best seen in FIG. 3, the magnetic flux flow through pole area 90 on one side of the P2 pole tip 70 will differ from the magnetic flux flow through area 94 on the opposite side of the P2 pole tip. This tends to create an asymmetric field distribution upon the magnetic media, such that the side writing created on either side of the a written track is different, which can lead to problems in reading data from the hard disk. Additionally, the oval, looped shape of the pole piece 52 can result in difficulties in controlling magnetic domains within the pole piece. That is, generally, the efficient flow of magnetic flux through the pole pieces is influenced by the shape and orientation of magnetic domains within the pole materials, as is well known to those skilled in the art. Creating and orienting magnetic flux domains within the oval write head element pole piece 52 can be a difficult task. Having described the significant features of prior art write head elements, the significant features and advantages of the preferred embodiments of the present invention can now be described and understood.

A schematic depiction of a first preferred embodiment of the present invention is depicted in FIGS. 5 and 6, wherein FIG. 5 is a top plan view and FIG. 6 is an end elevational view. As depicted in FIGS. 5 and 6, the first preferred embodiment 100 of the magnetic head write head element of the present invention includes a generally squarish P1 pole 108, having a P1 pole front leg 112, a left side leg 116, a right side leg 120, and a back leg 124, such that a hole 128 is formed between the legs. A P2 pole 136 is formed on top of the P1 pole front leg 112, and it generally includes a back portion 140 that is magnetically engaged to the back leg 124, and a P2 pole tip portion 148 that is centrally located above the P1 front pole leg 112. As is best seen in FIG. 6 a write gap layer 152 is formed between the P1 pole leg 112 and the P2 pole tip 148. With the appropriate fabrication of an induction coil, as is described herebelow, magnetic flux is caused to flow in the direction of arrows 160 provided in FIG. 5; it being understood that the magnetic flux also flows in the opposite direction of the arrows 160 upon magnetic flux reversal caused by electrical current reversal in the induction coils.

A first significant feature and advantage of the magnetic head 100 is that there is very little overlapping area between the P1 pole 108 and the P2 pole 136. The magnetic head 100 therefore has significantly reduced magnetic flux leakage between the magnetic poles 108 and 136, as compared to the prior art magnetic head 10 depicted in FIGS. 1 & 2. Another significant feature and advantage of the magnetic head 100 is that the side magnetic fields are symmetrical about the P2 pole tip 148. That is, as compared to the magnetic head 50 depicted in FIGS. 3 & 4, any side writing magnetic fields around the P2 pole tip 148 will be generally symmetrical, because the magnetic flux that flows through the P2 pole tip 148 flows generally equally through the front pole leg 112 to the left side leg 116 and right side leg 120 of the P1 pole 108.

Figure 8:
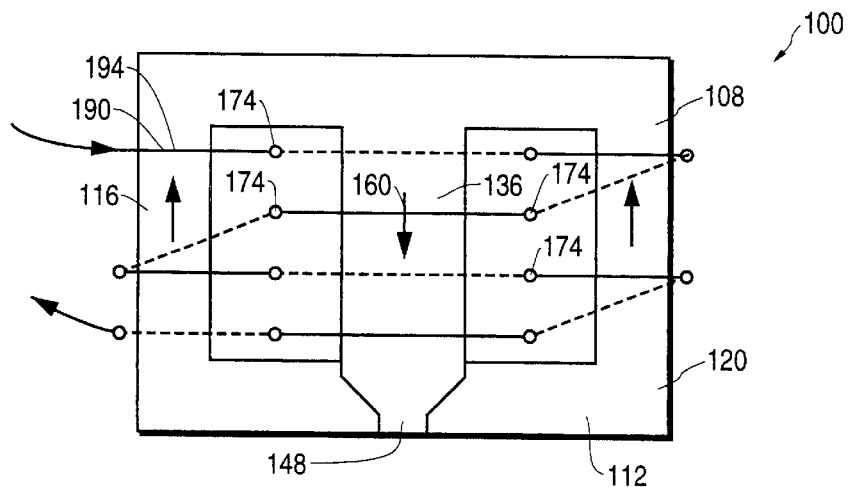
FIG. 8 is a top plan view depicting another helical coil winding embodiment of the present invention.
Figure 9:
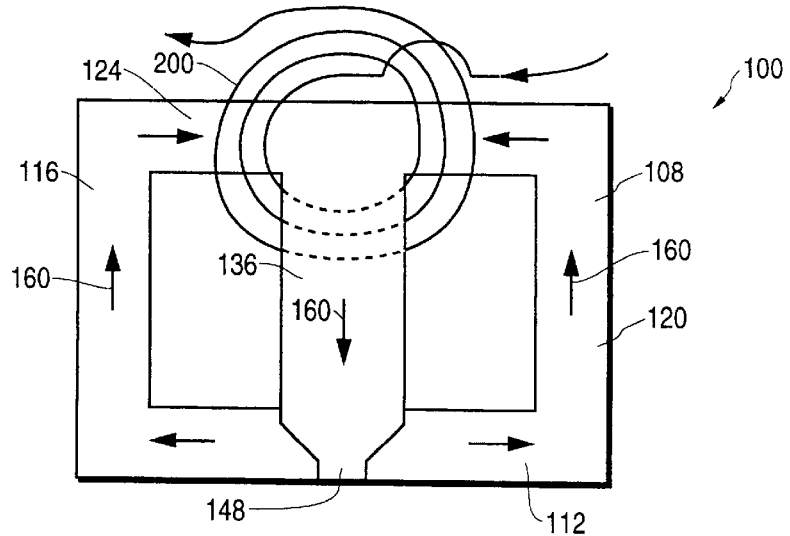
FIG. 9 is a top plan view depicting a spiral coil winding embodiment of the present invention.

FIGS. 7, 8 and 9 depict alternative induction coil winding configurations that are suitable for use with the magnetic pole configuration of the magnetic head 100 as depicted in FIGS. 5 and 6. With regard to FIG. 7, a first section of a helical coil 170 is wound over and around the left side leg 116. Vertical interconnects 174 are formed throughout the helical coil in its fabrication process, as is well known to those skilled in the art. The coil 170 is then helically wound downward, under and around the P2 pole 136. Thereafter, the coil 170 is helically wound upward over and around the right side leg 120. The direction of winding of the helical coil 170 around the pole piece sections 116, 120 and 136 is important to induce magnetic flux flow in the proper direction in the pole pieces according to the right hand rule. Of course, alternatively, a helical coil 170 can merely be fabricated just around the P2 pole piece 136, such as coil portion 178. This alternative configuration is easier to fabricate and it maintains magnetic field symmetry within the device, however, the magnetic field flux created within the magnetic head is reduced due to the fewer overall number of induction coil turns in the coil 178 as compared to the three section coil 170.

The alternative induction coil design 190 depicted in FIG. 8 is fabricated with coil windings 194 that weave over the left side leg 116, under the P2 pole 136, over the right side leg 120, back under the right side leg 120, over the P2 pole 136 and under the left side leg 116, in what basically can be described as a weaving pattern. This weaving induction coil pattern creates magnetic fields within the pole legs 116, 120 and P2 pole 136 that flow in the proper direction according to the right hand rule, and, due to the fewer number of vertical line interconnects 174 as compared to the coil winding embodiment 170 depicted in FIG. 7, may be simpler to fabricate.

Another alternative coil winding design 200 that is suitable with the pole design of the magnetic head 100 is the flat, spiral induction coil design that is depicted in FIG. 9, and is similar to the induction coil generally utilized in prior art magnetic heads, such as is depicted in FIGS. 1 and 2. Fabrication methods for the flat spiral induction coil are well known and understood. The magnetic pole area that is influenced by the spiral coil of FIG. 9 can be somewhat less than the helical coil designs of FIGS. 7 and 8, such that the magnetic flux induced by the spiral coil is likewise less. Of course, the shape and width of the back leg 124 and the P2 pole 136 can be increased, without departing from the generalized symmetrical shape of the P1 pole, such that sufficiently large magnetic fields are generated utilizing a spiral coil design of FIG. 9.

Figure 10:
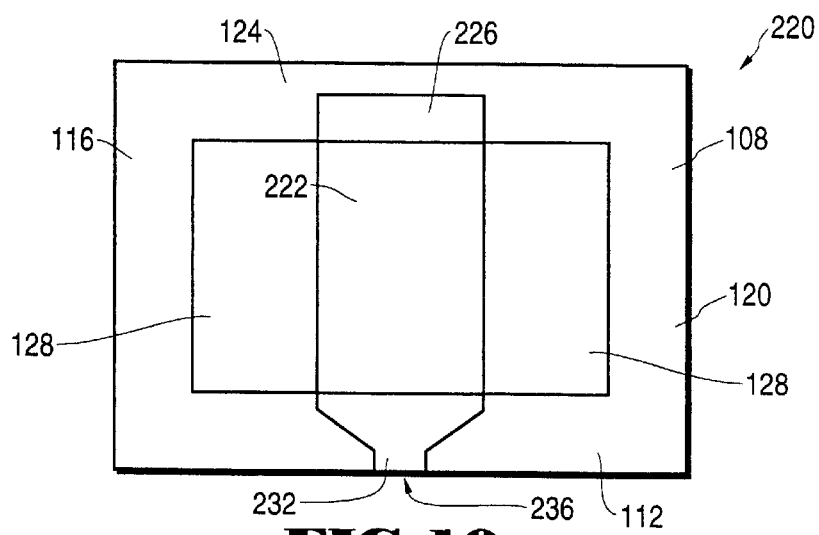
FIG. 10 is a top plan view depicting a second magnetic pole embodiment of the present invention.
Figure 11:
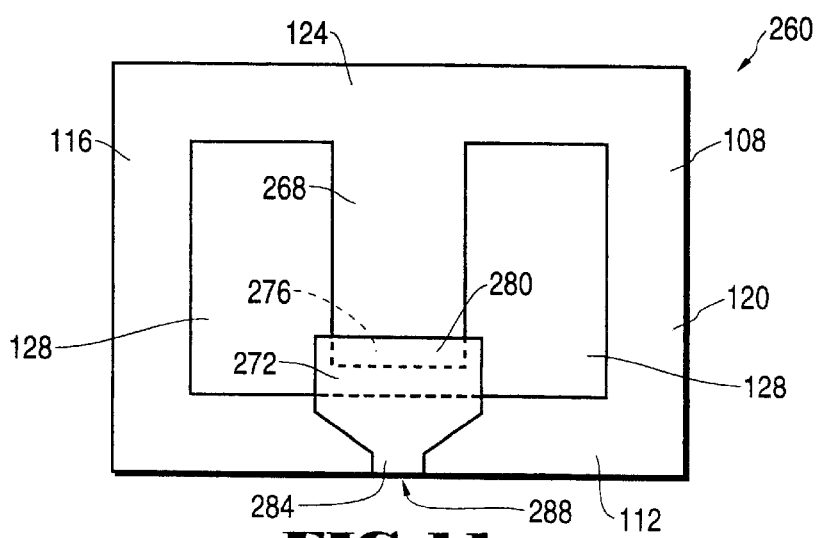
FIG. 11 is a top plan view depicting an alternative second magnetic pole embodiment of the present invention.

FIGS. 10 and 11 depict two alternative P2 pole designs of the present invention, it being understood that the induction coil designs described hereabove are generally suitable for use with either of them. With regard to the P2 pole design 220 depicted in FIG. 10, the P2 pole 222 is fabricated as a single piece that is magnetically connected at its back end 226 with the back leg 124 of the P1 pole 108. Generally, in fabricating this magnetic head structure, the squarish P1 pole 108 is first fabricated with the hole 128 centrally formed. Of course, induction coils and insulation layers, as appropriate to the induction coil design selected, must be fabricated. Thereafter, the P2 pole 222 is fabricated onto the P1 pole 108, such that a good magnetic field connection exists at the back end 226, and a suitable P2 pole tip 232 and write gap 236 are formed at the front pole leg 112.

In the alternative P2 pole embodiment 260 depicted in FIG. 11, the P1 pole 108 is formed with a downward central leg 268 that is fabricated in the same plane as the other leg portions 112, 116, 120 and 124 of the P1 pole. The appropriate induction coil components are fabricated. A shortened P2 pole 272 is then fabricated upon the end portion 276 of the central leg 268, with a good magnetic flux connection at the back end 280 and a P2 pole tip 284 with a suitable pole tip gap 288 at the front pole leg 112.

A magnetic head performance difference can exist between the alternative P2 pole embodiments depicted in FIGS. 10 and 11 when the P2 pole 222 or 272 respectively and the P1 pole 108 are fabricated from different materials. Specifically, the P1 pole 108 can be fabricated from Permalloy (NiFe 80/20) that forms comparatively good magnetic domains which result in good magnetic permeability and therefore good magnetic flux flow properties. The P2 pole can advantageously be fabricated utilizing NiFe 45/55, which has a higher magnetic moment than Permalloy, but tends to have poorer magnetic domain formation and higher magnetostriction. Therefore, the alternative embodiments depicted in FIGS. 10 and 11 can have different characteristics where the P2 pole pieces 222 or 272 are of significantly different sizes and formed from different material than the P2 pole.

Figure 12:
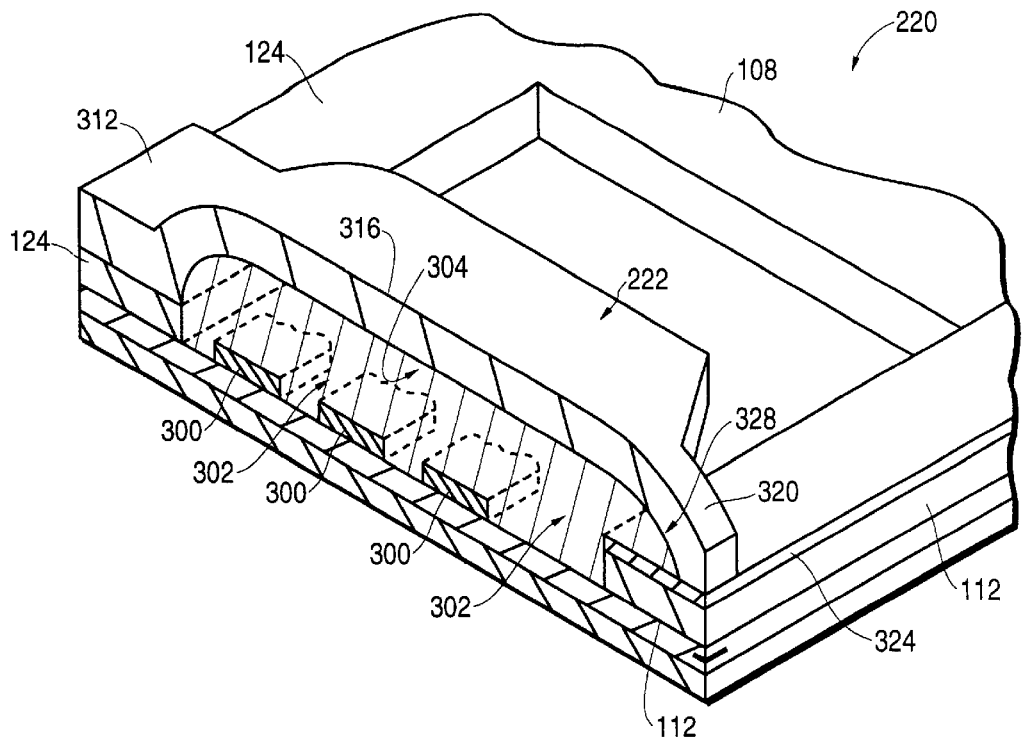
FIG. 12 is a perspective view depicting steps in a fabrication method of the magnetic head depicted in FIG. 10.
Figure 13:
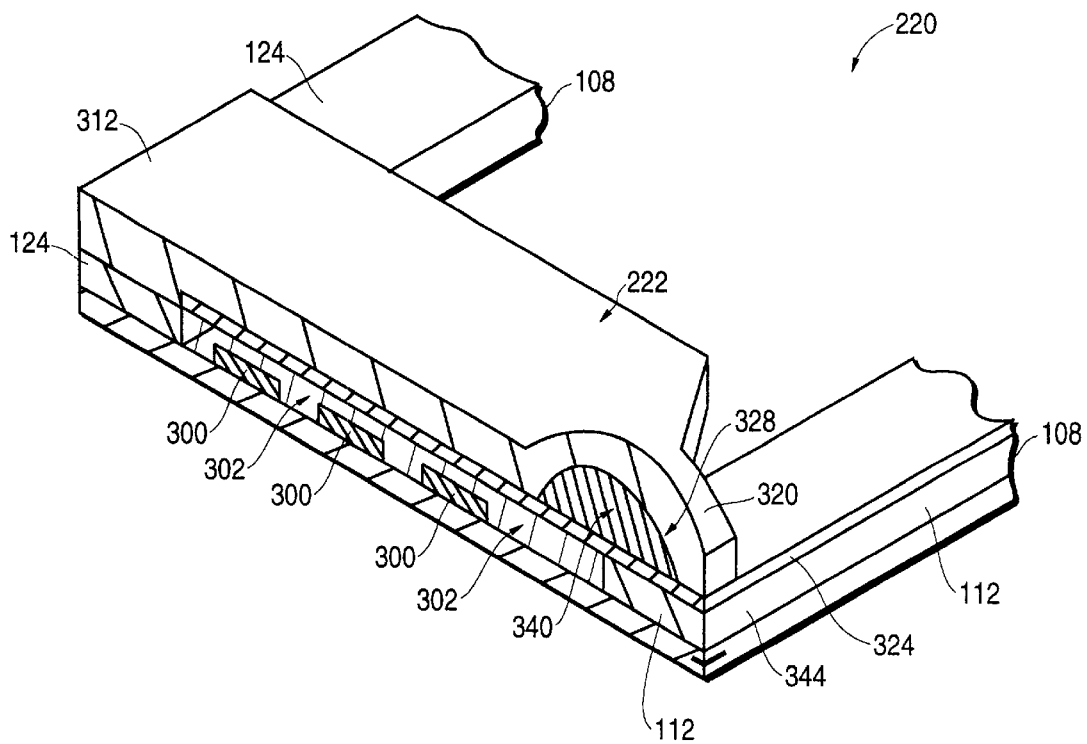
FIG. 13 is a perspective view depicting steps in an alternative fabrication method of the magnetic head depicted in FIG. 10.

FIGS. 12 and 13 are perspective views with cut away portions that depict alternative manufacturing steps in the fabrication of the magnetic head 220 depicted in FIG. 10. As depicted in FIG. 12, the P1 pole 108 is formed as a squarish planar closed structure. Thereafter, utilizing standard fabrication techniques, the lower elements 300 of the induction coil 176 are centrally formed in the area that will be covered by the P2 pole 222. The formation of the coils 300, and the insulation layers 302 on top of the coils 300 create a raised topology 304 in the central portion of the P1 pole 108. As depicted in FIG. 12, the P2 pole 222 is then fabricated on top of the P1 pole 108 and the raised central area 304, such that the back portion 312 of the P2 pole 222 is deposited upon the back leg 124 of the P1 pole to obtain good magnetic flux conduction therethrough. The central portion 316 of the P2 pole has a raised topology due to it being formed on top of the raised topology 304 of the induction coils. The pole tip area 320 of the P2 pole 222 projects downwardly from the raised topology of the central portion 316 of the P2 pole to the write gap layer 324 that is formed on top of the P1 pole leg 112. The apex portion 328 of the P2 pole tip 320 is separated from the P1 pole leg 112 by the raised topology 304 of the insulation layers that are formed on top of the coils 300. FIG. 12 thus depicts the fabrication of the P2 pole piece 222 without a planarization step immediately preceding it.

FIG. 13 depicts the fabrication of the magnetic head where a planarization step is performed following the deposition of the insulation on top of the induction coils 300. The planarization step is conducted down to the upper surface of the P1 pole 108, and the P2 pole 222 is fabricated thereon, such that the back end 312 of the P2 pole 222 is deposited onto the back leg 124 of the P1 pole to make a good magnetic flux connection therewith. A small insulator bump 340 (which can be photoresist or alumina) is fabricated on top of the write gap layer 324 back away from the ABS surface 344 in order to provide a gap between the back or apex portion 328 of the P2 pole tip 320 and the P1 pole, in order to reduce flux leakage from the apex portion 328 of the P2 pole tip 320 to the P1 pole leg 112. As indicated above, improved magnetic head efficiency is achieved when the magnetic flux flows through the pole tips at the ABS surface.

Figure 14:
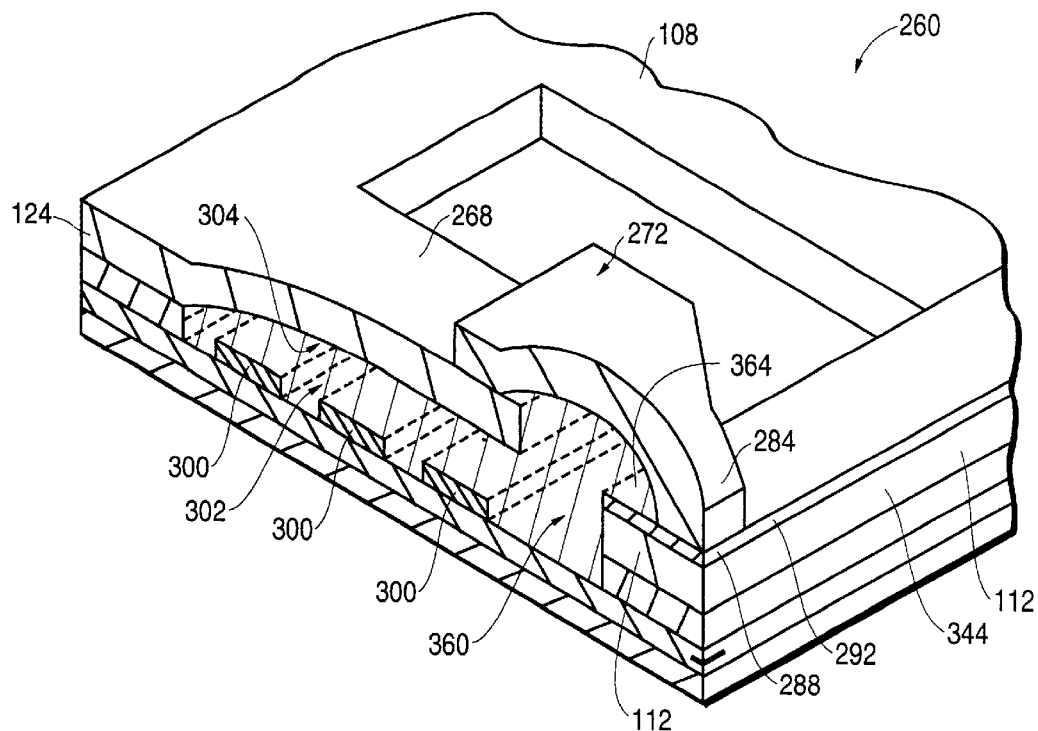
FIG. 14 is a perspective view depicting steps in a fabrication method of the magnetic head depicted in FIG. 11.
Figure 15:
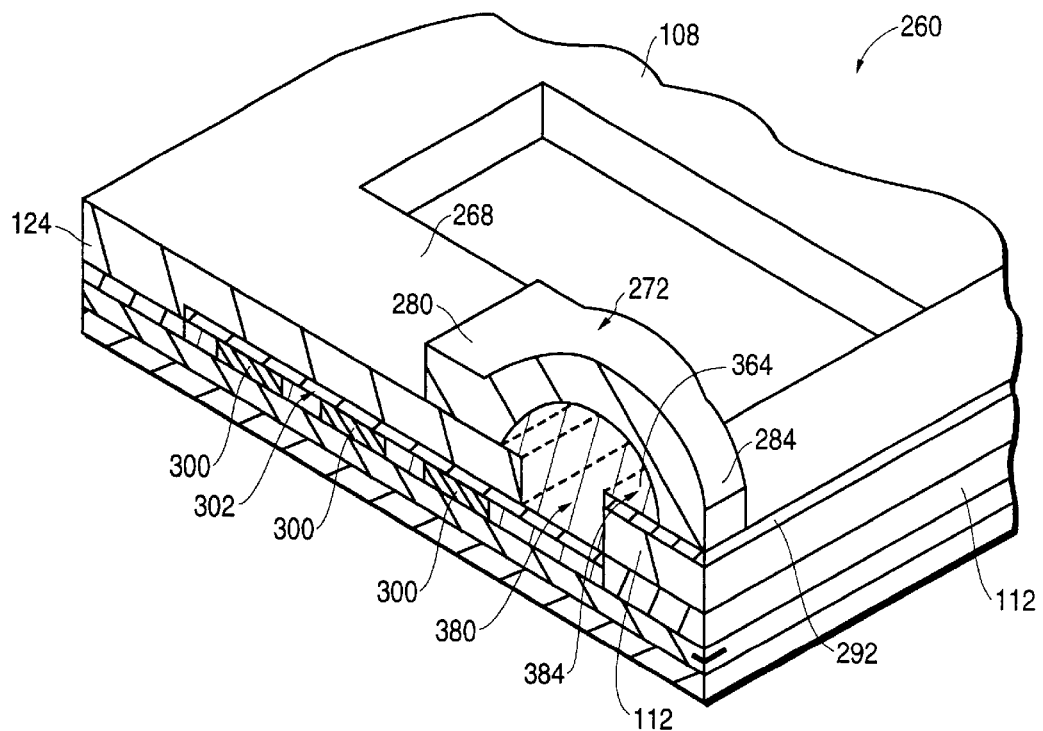
FIG. 15 is a perspective view depicting steps in an alternative fabrication method of the magnetic head depicted in FIG. 11.

FIGS. 14 and 15 depict alternative manufacturing steps in the fabrication of the magnetic head 260 with the shortened P2 pole 272 depicted in FIG. 11 and described hereabove. As depicted in FIG. 14, the lower elements 300 of the induction coils 170 are first fabricated in a layer beneath the legs of the P1 pole 108 and the insulation layers 302 deposited on top of the coils 300 create a raised topology 304. Thereafter, the P1 pole 108 is deposited and the central leg 268 is formed on top of the coils with a raised topology. Thereafter, the P2 pole 272 is fabricated onto the center leg 268 so as to provide good magnetic flux conduction. The P2 pole tip 284 is fabricated with a downward topology onto the write gap layer 292 that is formed on top of the P1 pole leg 112. While problems exist in fabricating a P2 pole tip on a sloped topology, a benefit is that a natural gap 360 is created at the back or apex end 364 of the P2 pole tip 284, such that magnetic flux primarily flows through the pole tip gap 288 at the ABS surface 344.

FIG. 15 depicts a modification of the magnetic head 260 depicted in FIG. 14 in that a planarization step is conducted following the deposition of the induction coils 300, such that the P1 pole 108 is fabricated upon a flat surface. Thereafter, the P2 pole 272 is fabricated upon the end of the central leg 268 such that good magnetic flux conduction occurs between the central leg 268 and the back end 280 of the P2 pole 272. A mound of insulative material 380 is formed at the back or apex end 364 of the P2 pole tip 284 to create a gap 384 between the apex end of the P2 pole tip and the P1 pole leg 112, such that the flux leakage from the P2 pole tip 272 is reduced.

Figure 16:
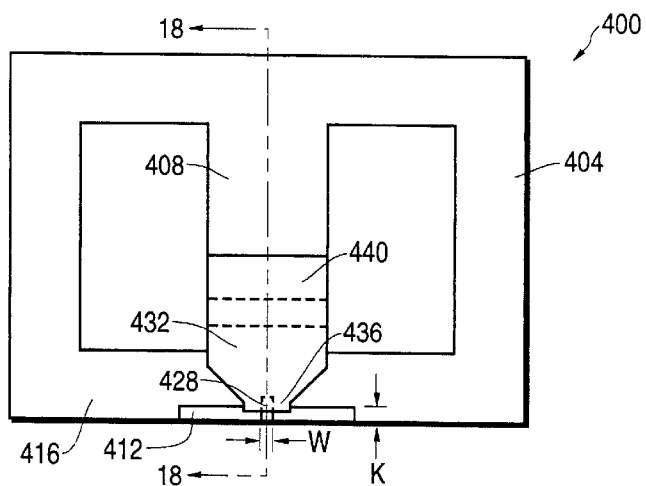
FIG. 16 is a top plan view of another magnetic head embodiment of the present invention.
Figure 17:
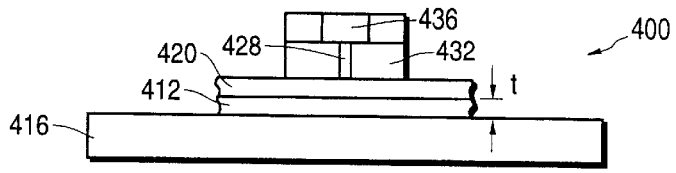
FIG. 17 is an end elevational view of the magnetic head depicted in FIG. 16.
Figure 18:
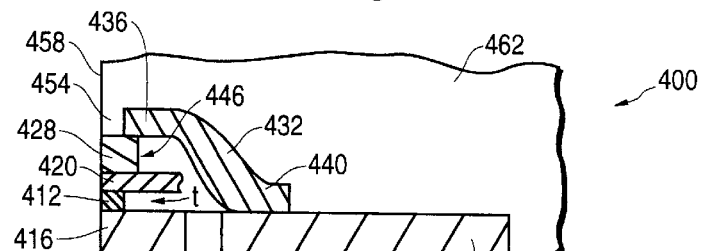
FIG. 18 is a side cross-sectional view of the magnetic head depicted in FIG. 16, taken along lines 18—18 of FIG. 16.

Still another alternative magnetic head embodiment 400 of the present invention is depicted in FIGS. 16, 17 and 18, wherein FIG. 16 is a top plan view, FIG. 17 is a front elevational view and FIG. 18 is a side cross-sectional view taken along lines 18—18 of FIG. 16. As depicted in FIGS. 16, 17 and 18 the planar, squarish P1 pole 404 of the present invention is fabricated with a central leg portion 408, as depicted in FIG. 11 and described hereabove. Thereafter, a narrow P1 pole tip piece 412 is fabricated on top of the P1 front pole leg 416 having a thickness t and a throat length k. A write gap layer 420 is subsequently deposited upon the P1 pole tip piece 412 and upon insulative layers that would be fabricated to surround it as would be well understood by those skilled in the art of fabricating magnetic heads. Thereafter, a narrow P2 pole tip piece 428 having a width w is deposited on top of the write gap layer 420. Following the fabrication of the P2 pole tip 428 the remainder of the P2 pole 432 (sometimes termed a P3 layer) is fabricated onto the P2 pole tip at its front end 436, and onto the central leg 408 at its rearward end 440. Magnetic flux conduction then occurs from the middle leg 408 of the P1 pole through the P3 layer 432, through the P2 pole tip 428, across the write gap 420, into the P1 pole tip 412 and thereafter into the front pole leg 416 of the P1 pole 404. Advantageously, the front end 436 of the P3 layer 432 can be fabricated such that it is recessed 454 from the ABS surface 458 when the magnetic head is encapsulated 462, as will be understood by those skilled in the art.

The write head depicted in FIGS. 16, 17 and 18 possesses superior data writing characteristics. The fabrication of the separate P2 pole tip 428 on a flat surface 420 facilitates its formation with a relatively narrow width w which primarily defines the written track width of data written to magnetic media. Additionally, the length k of the P1 pole tip piece 412 defines the throat length of the write gap which can also be accurately formed because the P1 pole tip piece 412 is fabricated on a flat surface. As a result, magnetic flux leakage from the back portion 464 of the P2 pole tip 412 is reduced because the front pole leg 416 is recessed away from the P2 pole tip 428 by the thickness t of the P1 pole tip piece 412, whereby increased magnetic flux will flow across the write gap 420 at the ABS surface. Furthermore, by recessing 454 the front end 436 of the P3 pole 432 away from the ABS surface 458, sidewriting caused by flux leakage from the P3 pole 436 to the P1 pole tip 412 is reduced. These features and advantages of the pole tip depicted in FIGS. 16, 17 and 18, coupled with the features and advantages of the split yoke in reducing magnetic flux leakage by avoiding opposed magnetic pole surface areas provide for increased efficiency and performance characteristics of the magnetic head 400 of the present invention.

Figure 19:
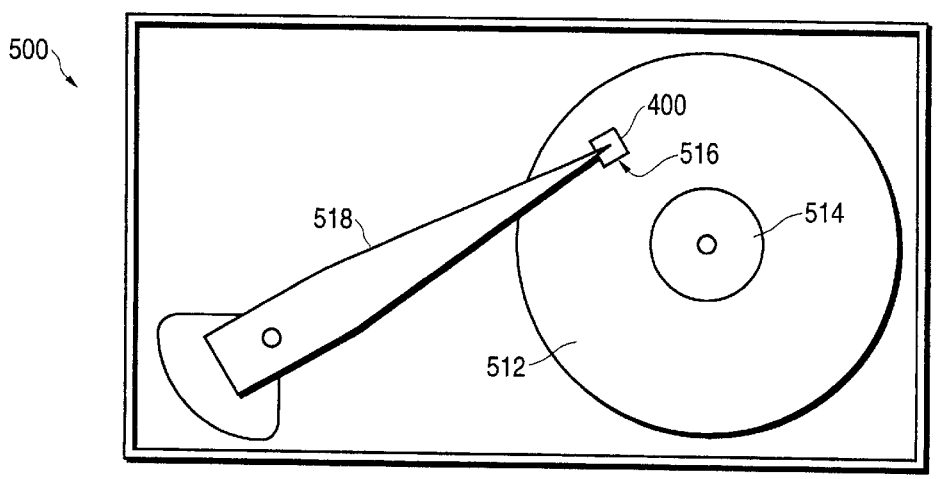
FIG. 19 is a top plan view of a hard disk drive device including the magnetic head of the present invention.

The magnetic heads of the present invention are utilized to read and write data to magnetic media, such as hard disks in hard disk drive devices. A simplified top plan view of a hard disk drive 500 is presented in FIG. 19, wherein at least one hard disk 512 is rotatably mounted upon a spindle 514. A slider 516, having a magnetic head, such as heads 100, 220, 260 and 400 of the present invention, formed thereon, is mounted upon an actuator arm 518 to fly above the surface of each rotating hard disk 512, as is well known to those skilled in the art. The magnetic head of the present invention enables the hard disk drive to write data to the hard disk more efficiently and at a faster data rate due to the configuration of the P1 pole and P2 pole of the magnetic head, as has been described in detail hereabove. The hard disk drive 500 is therefore more efficient and operates at increased data writing rates.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head, comprising:
   a first magnetic pole having an opening formed therethrough;
   a write gap layer formed on a portion of said first magnetic pole;
   a second magnetic pole being formed over said opening in said first magnetic pole; said second magnetic pole including a second magnetic pole tip that is disposed on top of said write gap layer and a rearward portion being magnetically engaged with portions of said first magnetic pole; and
   a helical induction coil being disposed around said second magnetic pole.

2. A magnetic head as described in claim 1 wherein said first magnetic pole is symmetrically disposed relative to said second magnetic pole tip.

3. A magnetic head as described in claim 1 wherein said first magnetic pole is generally planar, and includes a front leg, a pair of side legs and a back leg that are magnetically connected, and which together define said opening.

4. A magnetic head as described in claim 3 wherein said second magnetic pole includes a back portion that is magnetically connected with said back leg of said first magnetic pole, and wherein said second magnetic pole tip is centrally disposed relative to said front leg.

5. A magnetic head as described in claim 3 wherein said first magnetic pole further includes a central leg that projects into said opening, and wherein said second magnetic pole includes a back portion that is magnetically engaged to said central leg, and said second magnetic pole tip is centrally disposed relative to said front leg.

6. A magnetic head as described in claim 1 wherein said first magnetic pole and said second magnetic pole are formed from different materials.

7. A magnetic head as described in claim 6 wherein said first magnetic pole is comprised of Permalloy and wherein said second magnetic pole is comprised of NiFe 45/55.

8. A magnetic head as described in claim 1 wherein said helical induction coil is also formed around portions of said first magnetic pole.

9. A magnetic head as described in claim 1 wherein a helical induction coil is formed around portions of said first magnetic pole.

10. A magnetic head as described in claim 3 wherein
a first magnetic pole tip piece is formed upon said front leg;
said write gap layer is formed upon said first magnetic pole tip piece;
a second magnetic pole tip piece is formed upon said write gap layer; and
said second magnetic pole is formed in magnetic connection with said second magnetic pole tip piece.

11. A magnetic head as described in claim 10 wherein said second magnetic pole is recessed relative to air bearing surface portions of said second magnetic pole tip piece.

12. A magnetic head as described in claim 10 wherein said first magnetic pole tip piece is formed with a length (k) that determines throat length.

13. A magnetic head as described in claim 11 wherein said first magnetic pole tip piece is formed with a thickness (t) that defines a gap between said second magnetic pole tip piece and said front leg.

14. A magnetic head comprising:
a first magnetic pole including a front leg, a left side leg, a right side leg and a back leg that are disposed in a plane and which define a central opening within said first magnetic pole, and wherein said first magnetic pole further includes a central leg that is disposed in said plane and which projects into said opening;
a write gap layer being formed upon portions of said front leg of said first magnetic pole;
a second magnetic pole being formed over said opening in said first magnetic pole, said second magnetic pole including a second magnetic pole tip that is disposed above said write gap layer and centrally disposed relative to said front leg, said second magnetic pole further including a rearward portion that is magnetically engaged with said central leg of said first magnetic pole, such that said first magnetic pole is symmetrically disposed in relation to said second magnetic pole tip;
an induction coil being formed in relation to said first and second magnetic poles, such that magnetic flux is caused to flow within said legs of said first magnetic pole and into said second magnetic pole.

15. A magnetic head as described in claim 14 wherein said induction coil is helically wound around portions of said first magnetic pole.

16. A magnetic head as described in claim 15 wherein said induction coil is helically wound around portions of said second magnetic pole.

17. A magnetic head as described in claim 14 wherein said induction coil is a spiral, planar induction coil disposed within portions of said first magnetic pole and portions of said second magnetic pole.

18. A hard disk drive comprising:
at least one hard disk being adapted for rotary motion upon a disk drive;
at least one slider device having a slider body being adapted to fly over said hard disk;
a magnetic head being formed on said slider body for writing data on said hard disk, said magnetic head including:
a first magnetic pole having an opening formed therethrough;
a write gap layer formed on a portion of said first magnetic pole;
a second magnetic pole being formed over said opening in said first magnetic pole; said second magnetic pole including a second magnetic pole tip that is disposed on top of said write gap layer and a back portion being magnetically engaged with portions of said first magnetic pole; and
a helical induction coil being disposed around said second magnetic pole.

19. A hard disk drive as described in claim 18 wherein said first magnetic pole is symmetrically disposed relative to said second magnetic pole tip.

20. A hard disk drive as described in claim 18 wherein said first magnetic pole is generally planar, and includes a pole tip leg, a pair of side legs and a back leg that are magnetically connected, and which together define said opening.

21. A hard disk drive as described in claim 20 wherein said second magnetic pole includes a back portion that is magnetically connected with said back leg of said first magnetic pole, and wherein said second magnetic pole tip is centrally disposed relative to said pole tip leg of said first magnetic pole.

22. A hard disk drive as described in claim 20 wherein said first magnetic pole further includes a middle leg that projects into said opening, and wherein said second magnetic pole back portion is magnetically engaged to said middle leg, and said second magnetic pole tip is centrally disposed relative to said pole tip leg of said first magnetic pole.

23. A hard disk drive as described in claim 18 wherein said first magnetic pole and said second magnetic pole are formed from different materials.

24. A hard disk drive as described in claim 23 wherein said first magnetic pole is comprised of Permalloy and wherein said second magnetic pole is comprised of NiFe 45/55.

25. A hard disk drive as described in claim 18 wherein said helical induction coil is also wound around portions of said first magnetic pole.

26. A hard disk drive as described in claim 18 wherein a helical induction coil is formed around portions of said first magnetic pole.

27. A hard disk drive as described in claim 20 wherein
a first magnetic pole tip member is formed upon said first magnetic pole tip leg;
said write gap layer is formed upon said first magnetic pole tip member;
a second magnetic pole tip member is formed upon said write gap layer; and
said second magnetic pole is formed in magnetic connection with said second magnetic pole tip member.

28. A hard disk drive as described in claim 27 wherein said second magnetic pole is recessed relative to air bearing surface portions of said second magnetic pole tip member.

* * * * *